United States Patent [19]

Beckett

[11] Patent Number: 5,519,502
[45] Date of Patent: May 21, 1996

[54] METHOD AND APPARATUS FOR SELECTIVELY LINEARIZING CELLS IN AN ENGRAVER

[75] Inventor: Tony D. Beckett, Dayton, Ohio

[73] Assignee: Ohio Electronic Engravers, Inc., Dayton, Ohio

[21] Appl. No.: 223,769

[22] Filed: Apr. 6, 1994

[51] Int. Cl.$^6$ .............................. B41C 1/02; H04N 1/387
[52] U.S. Cl. ............................................ 358/299; 358/298
[58] Field of Search ................................. 358/299, 298, 358/267

[56] References Cited

U.S. PATENT DOCUMENTS

| | | | |
|---|---|---|---|
| 3,784,739 | 1/1974 | de Vos et al. | 178/6.6 B |
| 3,956,583 | 5/1976 | Pugsley | 178/6.6 R |
| 4,174,527 | 11/1979 | Schaefer | 358/267 |
| 4,484,232 | 11/1984 | Gast | 358/299 |
| 4,500,929 | 2/1985 | Buechler | 358/299 |
| 4,688,101 | 8/1987 | Diekves et al. | 358/299 |
| 5,229,861 | 7/1993 | Nozaka et al. | 358/299 |

*Primary Examiner*—Peter S. Wong
*Assistant Examiner*—Eric Frahm
*Attorney, Agent, or Firm*—Jacox, Meckstroth & Jenkins

[57] ABSTRACT

This invention relates to a method and apparatus for linearizing engraving cells to be engraved in order to adjust for visual discontinuities. An engraver for engraving a cylinder comprises a controller having data stored therein. The data generally corresponds to at least one line of cells to be engraved on the cylinder. The engraver also comprises an engraving head coupled to the controller and operatively mounted in the engraver. The engraver further comprises means located in the controller for using filter criteria to selectively filter and linearize the data so that the controller can subsequently energize the engraving head to engrave the at least one line of cells so that it appears continuous. A method for engraving the cells comprises the steps of examining present pixel data associated with a line of cells to be engraved; determining whether the present pixel data should be linearized; and selectively linearizing the present pixel data if it is determined that the present pixel data should be linearized.

28 Claims, 9 Drawing Sheets

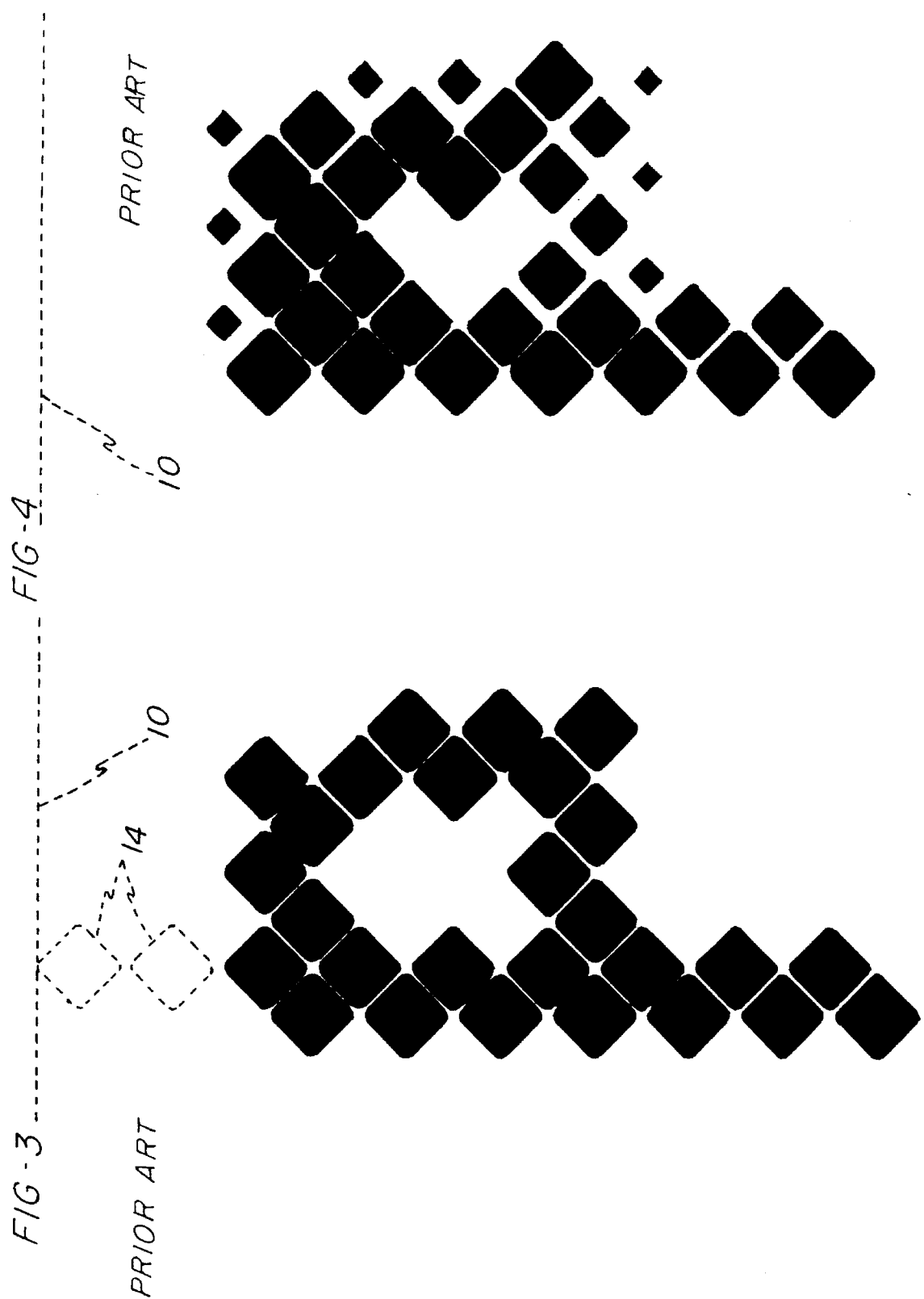

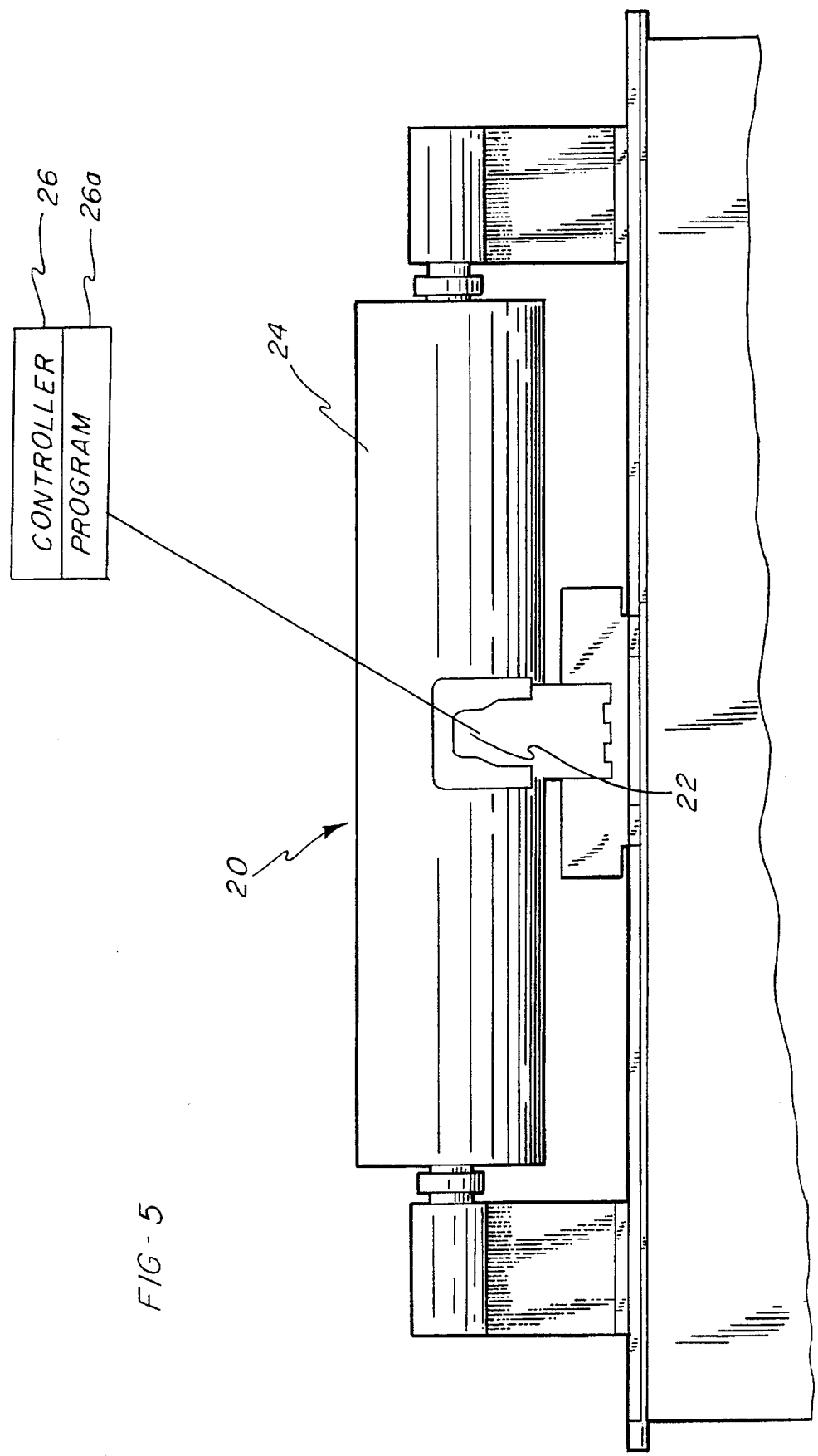

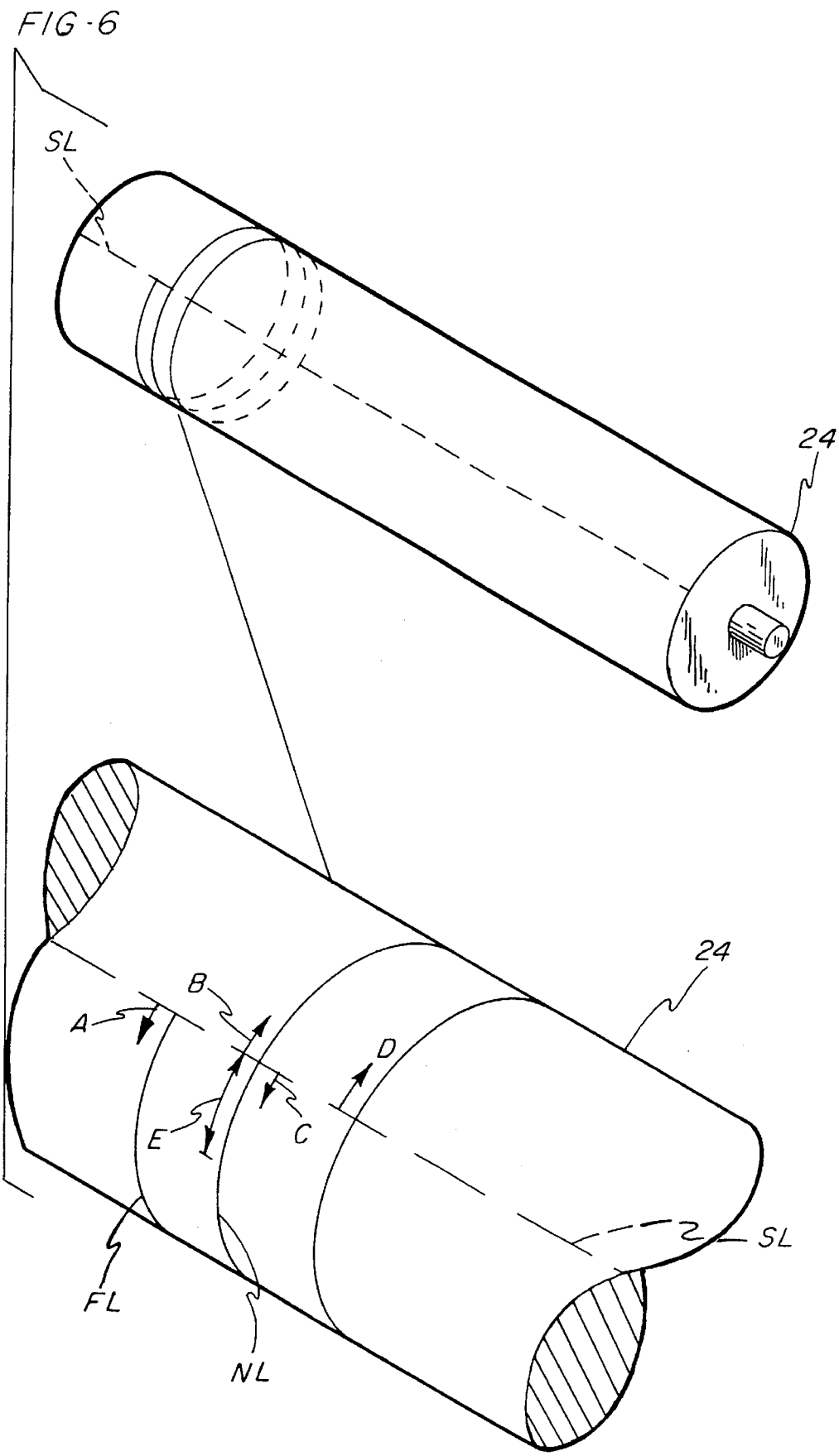

METHOD AND APPARATUS FOR SELECTIVELY LINEARIZING CELLS IN AN ENGRAVER

This invention relates to the production of a gravure printing cylinder. A series of cavities are engraved upon the surface of such a printing cylinder for receiving a printing ink in a pattern to be printed on a substrate. Cavities of appropriate size may be engraved by rotating the cylinder about its longitudinal axis while oscillating a diamond stylus into surface contact therewith. The stylus is mounted in a stylus holder which is moved in a direction parallel to the cylinder axis as the engraving progresses. If the stylus movement is continuous, then engraving proceeds along a helical path on the surface of the cylinder. This type of engraving is commonly referred to as helical engraving.

Alternatively, the stylus holder may be stepped so as to produce engraving along a series of parallel surface circles. This type of engraving is commonly referred to as cylindrical engraving.

Helical engraving produces discontinuities in printed patterns which happen to bridge the seam of engraving line start points. This is due to the fact that pixel data is generated along a series of parallel lines whereas the cavities for reproducing that data are engraved along a single continuous helical line. Each line of pixel data is represented by cavities arranged along one complete turn of the helix. This causes the end of each engraved line to be offset from the beginning of the same line by about one-half of the cell width. An enlarged view of a typical printed result is illustrated in FIG. 1. It will be observed that lines extending in the vertical direction have breaks 12 along a horizontal line 10 positioned at the engraving start line.

The prior art attempted to deal with the above problem by "smearing out" the discontinuity so as to be less objectionable to the eye. FIG. 2 illustrates smeared printing areas 14 which result when the engraved cells on the printing cylinder which have been so linearized.

While the above-described linearization technique substantially improves the engraving process, it still has several problems. For example, engraving is adjusted for cells near the engraving start point, even when the start line has not been bridged. This is illustrated in FIGS. 3 and 4 which are greatly enlarged drawings of cell patterns which have been engraved for printing the letter "P". In both cases the cells begin below the engraving start line 10 by a short distance equal to the height of two non-engraved cells 14.

FIG. 3 shows engraved cells for a prior art engraver having no linearizing capability. For the particular pattern involved, no linearizing is required. Consequently the engraved cells appear in precisely the desired or correct pattern. However, a prior art engraver having a linearizing capability produces varying sized cavities in the pattern shown in FIG. 4. It is seen that the linearizing engraver "outsmarts" itself by making linearizing corrections where they are not desired. Also, for the prior art linearizing engraver, the linearization is not selective. The adjustment for long lines may be too abrupt, while the adjustment for short lines may be insufficient.

SUMMARY OF THE INVENTION

The present invention solves the problems in the prior art by providing a method and apparatus comprising a pixel data processing means which selectively skew-corrects or linearizes data to engrave a predetermined size cell at a desired location.

In one aspect this invention comprises a method for determining if the line of cells should appear substantially continuous; selectively linearizing the line of cells to provide a linearized line of cells if preselected criteria are met; and engraving the line of cells.

In another aspect, this invention comprises a method for (a) examining present pixel data associated with a line of cells to be engraved; (b) determining whether the present pixel data should be linearized; and (c) selectively linearizing the present pixel data if it is determined in step (b) linearization is required.

The method and apparatus linearizes sequentially appearing pixel darkness measurements over a data length equal to the number of consecutive measurements indicating a darkness above a predetermined minimum level, thereby eliminating any random noise level which is close to white (i.e. pixel values close to zero). Moreover the pixel data and associated engraving commands are "filtered" to determine whether they are "continuous" (i.e., of substantially the same value) for a predetermined number of cells adjacent the engraving start line. If the prescribed number of cells do not have a substantially equal or minimum level value, then linearization is not performed.

BRIEF DESCRIPTION OF THE DRAWING

FIG. 3 is an illustration of a pattern of engraved cells where linearization is neither desired nor performed;

FIG. 4 illustrates the effect of an unwanted linearization when a prior art engraver attempts to engrave the pattern of FIG. 3;

FIG. 5 is a fragmentary view of an engraving system in which this invention may be used;

FIG. 6 is a partially exploded view of a cylinder, showing lines which are engraved on the cylinder;

DESCRIPTION OF THE PREFERRED EMBODIMENT

Figure 1:
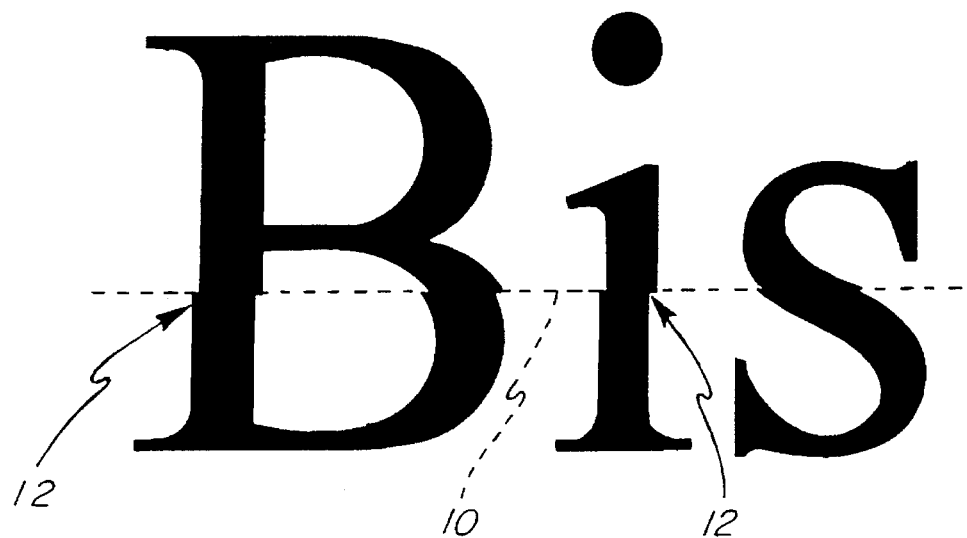
FIG. 1 is an enlarged view of skewed printing resulting from helical engraving of a printing cylinder.
Figure 2:
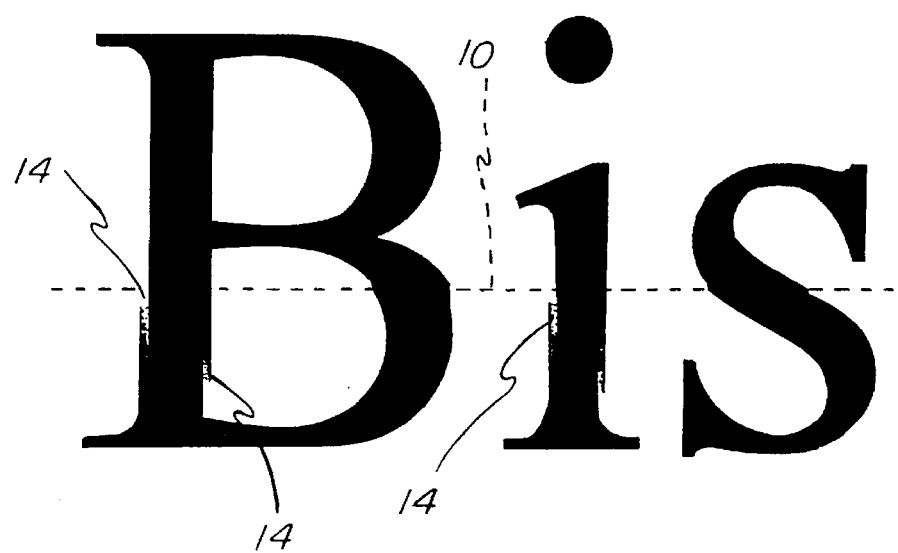
FIG. 2 illustrates the printed result of a data linearizing correction.

FIG. 5 is a diagrammatic view of an engraver 20 comprising an engraving head 22 for engraving a cylinder 24 with a plurality of engraved cells in order to form a pattern of cells. The pattern of cells form an image which corresponds to visual information which is printed on material, such as paper, when the cylinder is subsequently used in a printer. The engraver 20 comprises a controller 26 comprising program means or a program 26a for enabling the engraver 20 to perform linearization in accordance with an embodiment of this invention.

Figure 7:
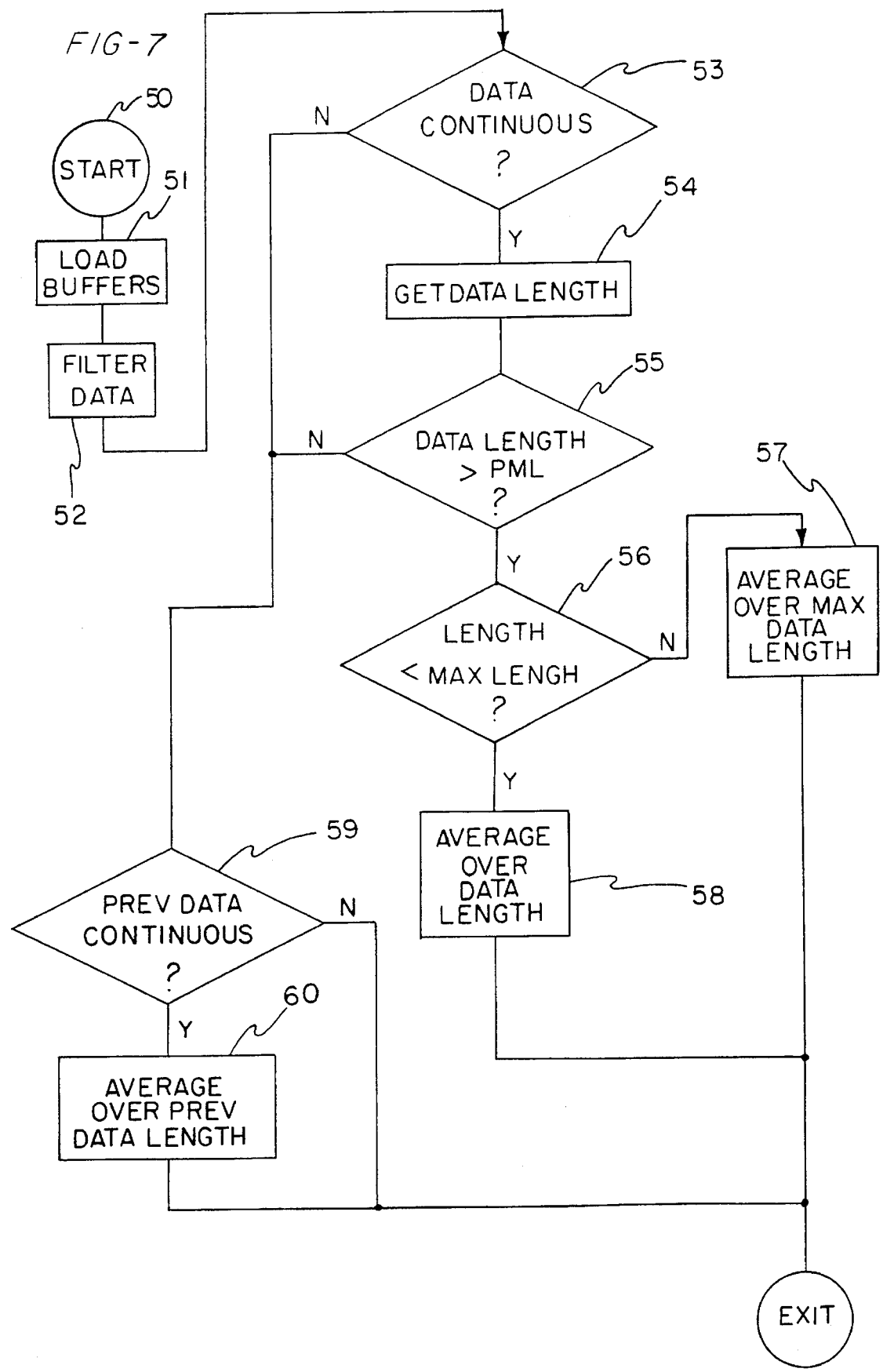
FIG. 7 is a flow chart of pixel data correction in accordance with the present invention.

The program 26a accomplishes linearization in accordance with the present invention by processing pixel information in the manner illustrated by the flow charts of FIGS. 7–10. The method involves continuous inspection or filtering of pixel data associated with each 360° line, such as a first line, FL, which is represented by the line of cells between arrows A and B in FIG. 6 and a new or second line, NL, which is a line adjacent to FL and which lies between arrows C and D. If the pixel data for line NL, for example, is not continuous for a predetermined length from the beginning of an engraving start point or line SL (identified by double arrows E in FIG. 6), then no linearizing correction is made. If, however, pixel data is continuous during the predetermined length, then a correction may be undertaken over an appropriate distance. This overall process is illustrated in FIG. 7.

The flow charts of FIGS. 7–10 merely present the programming for that part of an engraving process dealing with linearization. This programming is embodied in program means 26a (FIG. 5) of controller 26. Entry into the start point 50 of FIG. 7 is initiated by a function call from program 26a at the beginning of each new data line. Upon entry into the routine the program 26a loads data buffers (block 51) with raw pixel data for the present and immediately preceding scan lines associated with a present and immediately preceding line of cells, respectively. The program then filters the data (block 52) to determine whether it is continuous (point 53) for the predetermined length along the helical engraving track adjacent the engraving start line SL of FIG. 6.

Figure 8:
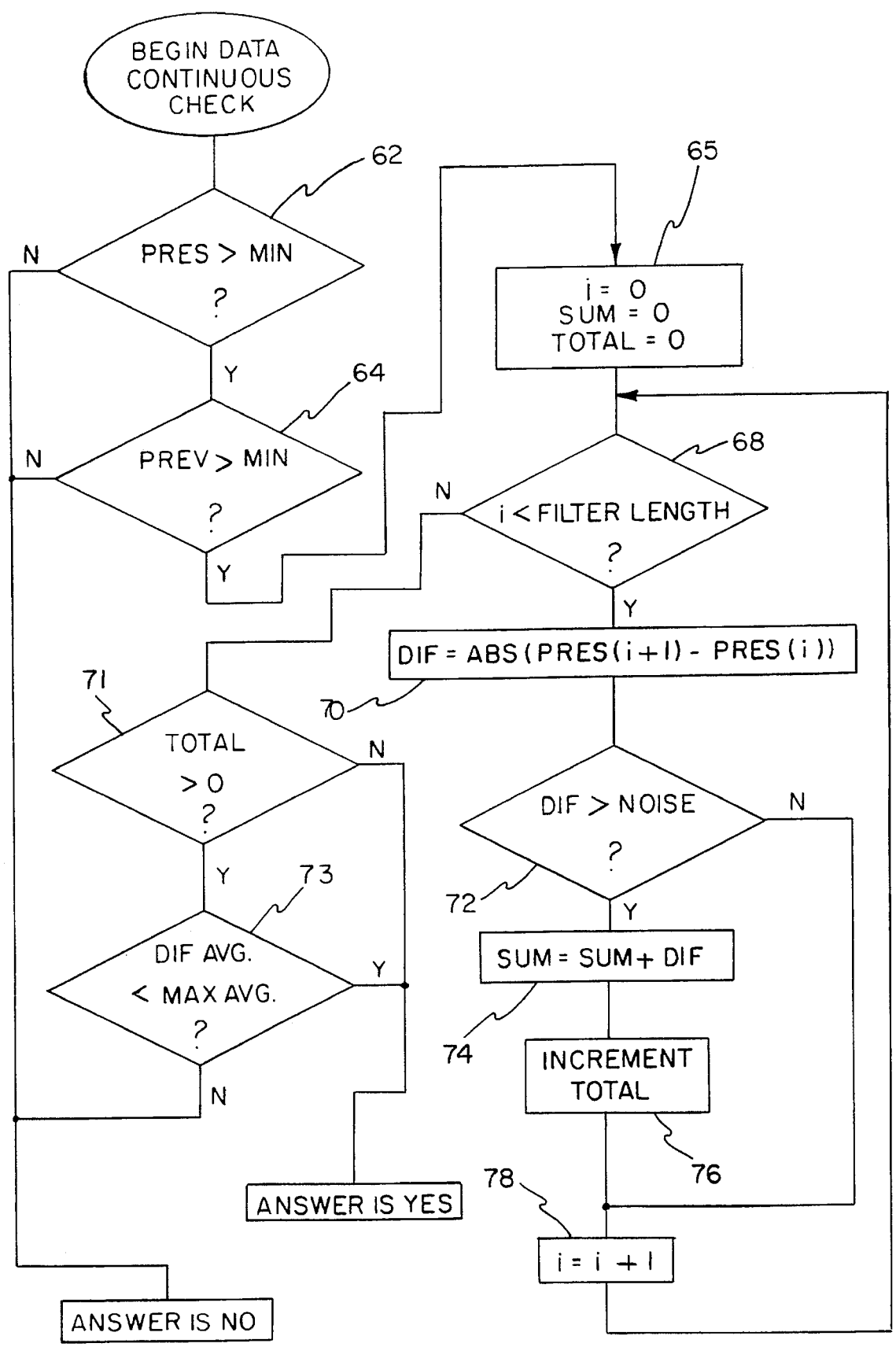
FIG. 8 is a flow chart of a data continuity check.

Details of the data-continuous check are illustrated in FIG. 8. That check produces "YES" or "NO" signals which are saved by controller 26 for use in generating corrected engraving commands for the present and next cylinder rotations. The program 26a also checks the length of the pixel data string to determine which data exceeds a predetermined minimum pixel value (block 54 in FIG. 7) and saves the data length for use during the present and succeeding passes (blocks 58 and 60). The predetermined minimum value is programmed into controller 26 and represents the minimum value of a pixel which will be looked for in determining the length of the data for purposes of linearizing.

If the data length is greater than zero (point 55), then a check is made (point 56) to determine whether the length is less than a predetermined maximum. If it is greater than a predetermined maximum, then linearization is achieved by averaging over the maximum length (block 57) or over the actual length (block 58) depending upon the result of the test at point 55.

Figure 9:
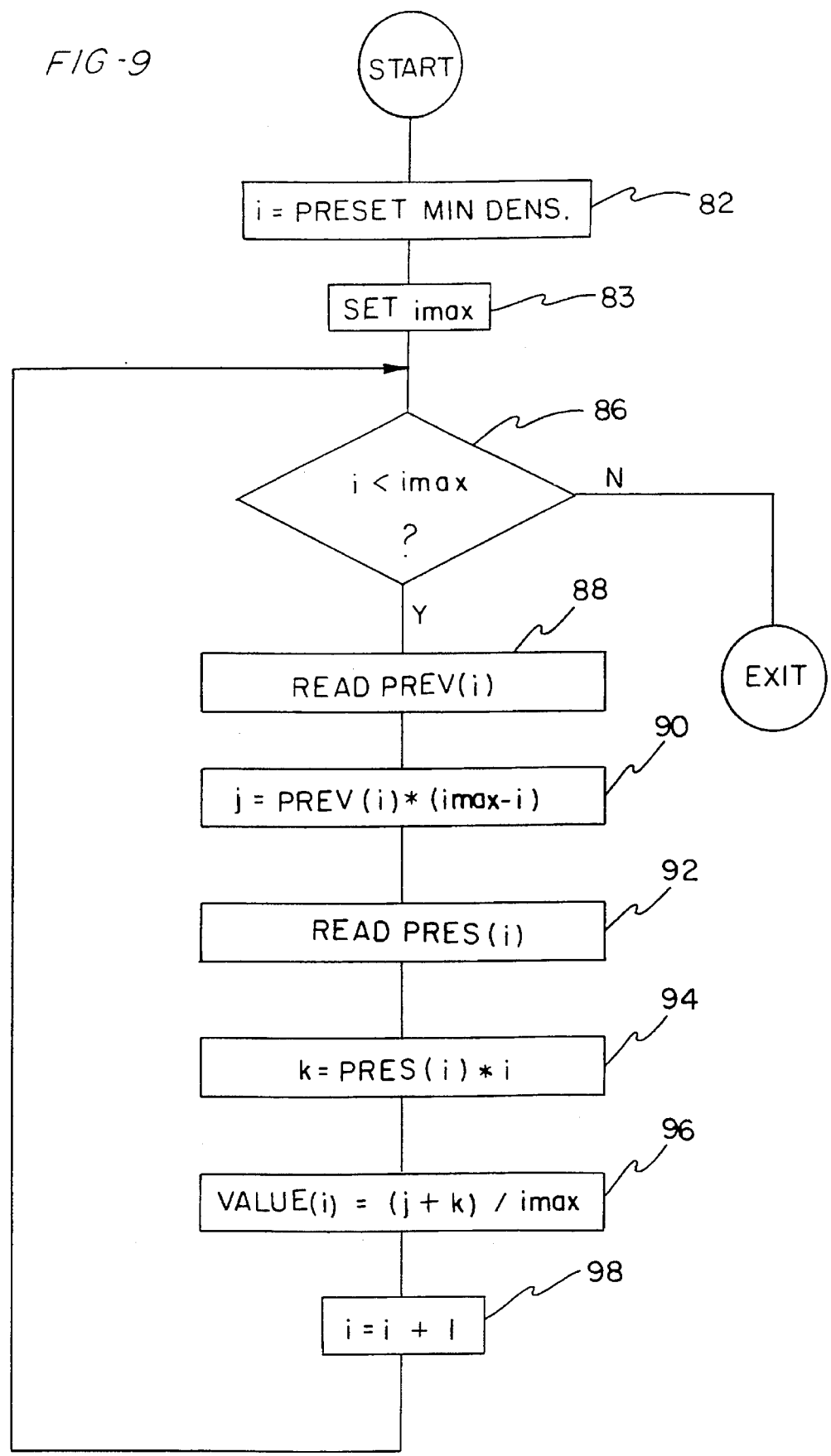
FIG. 9 is a flow chart of pixel data weighting.

If the data length does not exceed a preselected minimum length (PML) at block point 55, then a check is made at point 59 to determine whether the previous line was continuous. If so, then the data is averaged over the data length (block 60) for the previous line. If the previous line data was not continuous, then no linearization is performed, and the controller 26 (FIG. 5) generates engraving commands based upon pixel values only within the present scan line. Successively generated engraving commands, whether linearized or not, are saved in a build buffer (not illustrated) in controller 26 and sequentially transferred to the engraving head 22 or to a storage file in controller 26. FIG. 9 illustrates the logic steps involved in the operation of blocks 57, 58, 60.

Referring now to FIG. 8, the details of the data filtering logic will be explained The sequence begins at decision points 62 and 64 wherein a check is made to determine whether the present data, such as for line NL in FIG. 6, and the previous data, such as for line FL, from the present data line are both above a predetermined minimum value. If not, then the data is determined not to be continuous and the sequence continues to decision point 59 (FIG. 7).

If the present data and the previous data pass the checks at decision points 62 and 64, then necessary program variables are initialized (block 65), and a filtering process is undertaken to determine whether there follows a string of pixels of approximately the same density. Where any such string of similar density pixels for a present scan line, such as NL, is found to extend to the engraving start line SL (FIG. 6), the data for the portions of line NL which are above and below the line SL are presumed to be continuous.

Filtration continues with a loop count check at point 68, followed by a looping process through block 70, decision point 72, block 74, block 76, block 78 and back to decision point 68. At block 70, the program 26a computes the absolute value of the difference between the present and the immediately succeeding values of the pixel density level for the line being examined. A check is made at point 72 to determine whether this difference is greater than a predetermined noise level. If not, then the two pixel values are considered to be the same. However, if there is a difference greater than the noise level, then the value in the SUM register is increased by the value of the difference (block 74) and a counter known as TOTAL is incremented. In the embodiment described, the predetermined noise level is less than about 10% of the maximum value associated with a pixel. Thereafter, the loop counter is incremented (block 78). Looping then continues until the count reaches a preselected filter length which was previously programmed into controller 26.

After the filter looping process has been completed, the program checks the count in the TOTAL counter (point 71 in FIG. 8) and the average value of the accumulated differences (point 73). If the differences were all less than the noise level, then TOTAL will have a value of zero. This produces an answer of "YES" at point 71 for the data continuity check. A "YES" answer also results if the accumulated difference average (i.e., SUM divided by the TOTAL) is less than a predetermined maximum value. "NO" answers result if the first and second pixel values are not both above a predetermined minimum (blocks 62 & 64) or if the accumulated difference average is not less than the predetermined maximum value (block 73). A "NO" answer indicates that the data is not continuous and the filtration continues to point 59 (FIG. 7). A "YES" answer means that the data is continuous and filtration proceeds to block 54.

FIG. 9 illustrates the averaging technique as performed in any of blocks 57, 58 or 60 of FIG. 7. The technique begins by setting a counting variable, i, in a counter in controller 26 equal to the minimum density (block 82) and setting a maximum count value, imax, (at block 83) equal to the data length established in the flow chart of FIG. 7. Thereafter, the program 26a loops through a counting check 86 until the count in the loop counter reaches imax. Each time through the loop the program 26a reads the value of the ith pixel of the previous scan line (block 88) and calculates a weighted value at block 90. The weighted value, j, is computed by multiplying the previous value by a weighting factor established by subtracting the loop count from imax. It will be appreciated that the previous pixel data value was the value used for engraving a cell at the same engraving location during the immediately preceding rotation of the cylinder 24. The weighting factor for j begins with a value of imax and decreases toward a value of zero.

It should be appreciated that other linear and non-linear weighting approaches may be used. By way of example the numerator on the right-hand side of the expression appearing in block 96 could be replaced by the root means square of j and k.

At block 92 the program reads the present value of pixel density. At block 94 this is converted to a weighted value, k, equal to the present value times the loop count. It will be seen that the weighted value of the present density begins at a preset minimum density and proceeds to increase to imax. In the embodiment being described, the preset minimum density is about 45% of the maximum density, but this value may be varied to accommodate, for example, different inks and paper. At block 96, the program calculates a corrected pixel value by adding the two weighted values and dividing by imax. The loop count is increased at block 98. When the loop count reaches imax the program exits and returns to the routine illustrated in FIG. 7. That routine in turn exits to the main engraving control routine (not illustrated) in controller 26.

Figure 10:
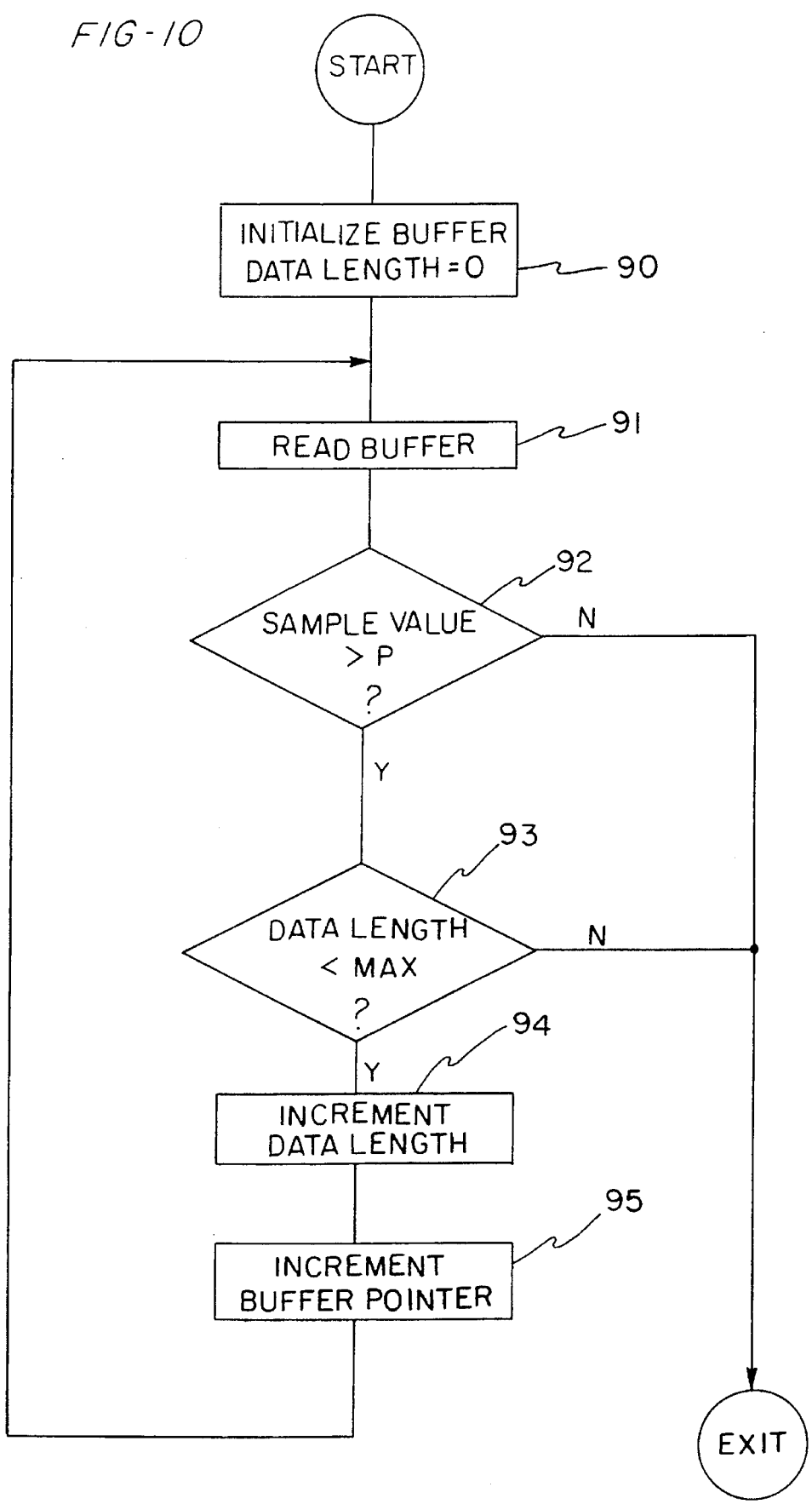
FIG. 10 is a flow chart illustrating the logic involved in the performance of obtaining the data length.

FIG. 10 illustrates the logic involved in the performance of the function of block 54 of FIG. 7. Briefly, this establishes the length of a string of pixel values which starts at the engraving start line and ends at the first occurrence of a pixel value less than a predetermined minimum P. Thus, the flow chart begins at block 90 where the value of a variable named DATA LENGTH is initialized to zero. A buffer pointer is also initialized at that time.

At block 91 the above-mentioned pointer is used to read a pixel value from a present value buffer. This value is checked at point 92 to determine whether it is above the predetermined minimum P. If not, there is an exit from the procedure. Otherwise, there is a check against a preset maximum data length at point 93. Following that check DATA LENGTH is incremented (block 94) and the buffer pointer is advanced (block 95). Thereafter, the program 26a reads a new pixel value from the buffer and continues doing so until either a pixel value less than P is read or DATA LENGTH reaches the preset maximum. The value of DATA LENGTH is then saved and an exit if performed.

Figure 11:
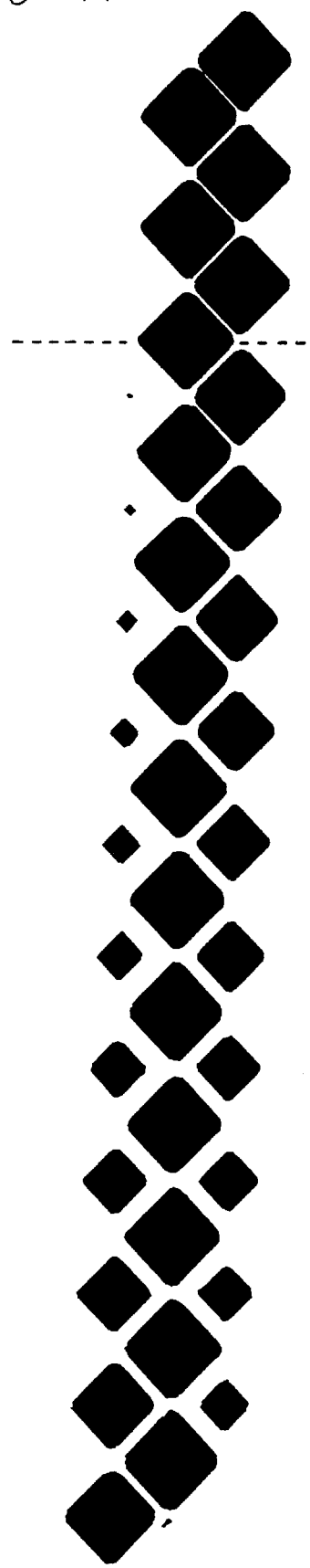
FIG. 11 is an illustration of the linearization according to this invention.

FIG. 11 illustrates the effect of the linearization as described above beginning at the engraving start point A (FIG. 6). Notice that the linearization technique causes a gradual tapering which facilitates making the engraved cells 11 appear continuous or non-helical.

It will be appreciated that the above-described data linearization may be performed on-line during engraving, or, alternatively, off-line for later engraving control. It will also be appreciated that linearized strings of pixel data may extend to the engraving start line from either direction. That is, the data skew correction may be inserted either above or below the engraving start line. This may be accomplished by weighting end-of-engrave data with pixel information from a next-to-be-engraved scan line.

Advantageously, this invention provides a method and apparatus for selectively linearizing only those lines or groups of cells which should be linearized in order to facilitate enhancing the visual appearance of cells which are ultimately engraved.

It should be appreciated that the values used to determine pixel densities could be based upon a pixel's area, rather than a digital represented of the pixel density. Also, it may be desired to "de-linearize" data, for example, if it were desire to go from a cylindrical to helical engraving.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An engraver for engraving a cylinder comprising:
   a controller for examining a set of data corresponding to at least one line of cells to be engraved on the cylinder and for energizing said engraving head;
   an engraving head coupled to said controller;
   means located in said controller for using at least one filter criteria to selectively linearize said data so that said at least one line of cells appears continuous when said at least one line of cells is engraved.

2. The engraver as recited in claim 1 wherein said filter criteria comprises a predetermined length of present pixel data from an engraving start line.

3. The engraver as recited in claim 1 wherein said filter criteria comprises a cumulative average density difference.

4. The engraver as recited in claim 1 wherein said filter criteria comprises means for determining whether a present pixel data item associated with said at least one line of cells and a corresponding previous pixel data item associated with a previous line of cells are greater than a predetermined minimum value.

5. A method for adjusting an engraver for discontinuities in an image, said method comprising the steps of:
   examining a set of present data associated with a group of density values corresponding to an image to be engraved;
   determining whether said set of present data is associated with a discontinuity in said image; and
   selectively linearizing said set of present data to adjust said engraver for said discontinuity if said present data is associated with a discontinuity.

6. The method as recited in claim 5 wherein said determining step comprises the step of:
   filtering said present data to determine whether said present data should be linearized.

7. The method as recited in claim 6 wherein said determining step comprises the step of:
   comparing said present data to a preselected minimum data amount.

8. The method as recited in claim 6 wherein said determining step comprises the step of:
   comparing a set of previous data corresponding to a group of density values immediately adjacent said present portion to said predetermined minimum data amount.

9. The method as recited in claim 6 wherein said step further comprises the step of:
   generating a discontinuity signal if either said set of present data or said set of previous data corresponding to a group of density values immediately adjacent said present portion is greater than a preselected minimum data amount.

10. The method as recited in claim 6 wherein said filtering step comprises the step of:
    determining an average difference representing a cumulative average of a difference between two consecutive points of said set of present data over a preselected filter length;
    generating a discontinuous signal if said average difference is greater than a preselected maximum average.

11. The method as recited in claim 10 wherein said determining step further comprises the step of:
    determining said cumulative average using only a sum of those differences which are greater than a predetermined noise level averaged over a total number of differences which exceeded the noise level.

12. The method as recited in claim 11 wherein said predetermined noise level is less than about 10% of a maximum value associated with a pixel.

13. The method as recited in claim 5 wherein said linearizing step comprises the step of:

weighting said set of present data if said set of present data is continuous;

energizing an engraving had in said engraver to engrave a line of cells so that said line of cells appears substantially discontinuous.

14. The method as recited in claim 13 wherein said weighting step comprises the step of:

using at least a portion of a previous data point associated with a previous line of pixel data to weight a present data point associated with at least a portion of said present line of said present set of data.

15. A method for engraving a line of cells; comprising the steps of:

determining if said line of cells should appear substantially continuous;

selectively linearizing said line of cells to provide a linearized line of cells if it is determined during said determining step that said line of cells should appear substantially continuous if preselected criteria are met; and engraving said selectively linearized line of cells onto a cylinder.

16. The method as recited in claim 15 wherein said linearizing step comprises the step of:

weighting a present pixel data set associated with said line of cells with a previous pixel data set associated with at least a portion of a previous line of cells if said line of cells need to be linearized.

17. The method as recited in claim 15 wherein said determining step comprises the step of:

filtering a present pixel data set associated with said line of cells to determine if said present pixel data set is continuous.

18. The method as recited in claim 15 wherein said linearizing step comprises the step of:

weighting said line of cells beginning at a preset minimum density.

19. The method as recited in claim 18 wherein the preset minimum density is about 45% of the maximum density for a pixel.

20. The method as recited in claim 17 wherein said filtering step comprises the step of:

examining a portion of said present pixel data set;

determining continuity using strings of minimum-valued present pixel data from said present pixel data set extending to an engraving start line;

weighting said present pixel data set if said portion is continuous.

21. The method as recited in claim 20 wherein said method further comprises the steps of:

determining data lengths for said strings by counting occurrences of data within said strings which meet a predetermined criterion;

using said data lengths for controlling said weighting.

22. The method as recited in claim 21 wherein said predetermined criterion is a predetermined minimum density value.

23. A method for generating a file of processed digital pixel data for controlling a helical engraver comprising the steps of:

(1) generating a file of raw digital pixel data for a plurality of adjacent pixel columns extending to a common engraving start line;

(2) establishing continuity data for at least one of said plurality of adjacent pixel columns by examining said file of raw digital pixel data and identifying strings of substantially similar and minimum-valued data extending to said engraving start line; and (3) generating said file of processed digital pixel data by weighting data from at least one string of said strings with data from an adjacent pixel column.

24. A method as recited in claim 23 further comprising the steps of determining data lengths for said strings by counting occurrences of data within said strings which meets a predetermined criterion, and using said data lengths for controlling said weighting.

25. A method as recited in claim 24 wherein said predetermined criterion is a predetermined minimum density value.

26. A method as recited in claim 23 wherein said strings are identified by the substeps of:

(1) selecting a filter length, (2) reading a first value of said raw digital pixel data for a first position in one of said columns adjacent said engraving start line, (3) reading a second value of said raw digital pixel data for a second position in said one of said columns adjacent said first position, (4) comparing said first value and said second value to determine a first difference component, (5) reading a third value of said raw digital pixel data for a third position in said one of said columns adjacent said second position, (6) comparing said second value and said third value to determine a second difference component, (7) repeating said reading and comparing substeps until a number of said first and second difference components equal to said filter length have been determined, (8) calculating an average difference value for those of said difference components which exceed a predetermined noise level, and (8) using said average difference value as an indication of said data continuity.

27. A method as recited in claim 26 further comprising the substeps of:

(9) counting the number of said difference components which exceed said predetermined noise level, and

(10) using said number of difference components as an indication of said data continuity.

28. A method of helically engraving a printing cylinder comprising the steps of:

(1) generating a file of raw digital data representing a plurality of darkness levels for a series of pixels arranged in a plurality of adjacent columns, (2) sequentially engraving a series of cells on said cylinder beginning at an engraving start point and extending circumferentially in a helical track about said cylinder at a plurality of depths corresponding to the sequence of said darkness levels, and (3) adjusting said file of raw digital data so that at least one of said plurality of depths of those of said series of cells which are engraved near an engraving start line extend axially through said engraving start point, said adjusting being made in accordance with weighted values of darkness levels and for those of said series of cells which extend to said engraving start line and having approximately equal depths.

* * * * *